US006954839B2

(12) United States Patent
Idei et al.

(10) Patent No.: US 6,954,839 B2
(45) Date of Patent: Oct. 11, 2005

(54) COMPUTER SYSTEM

(75) Inventors: Hideomi Idei, Yokohama (JP); Kazuhiko Mogi, Yokohama (JP); Takashi Oeda, Sagamihara (JP); Yasutomo Yamamoto, Sagamihara (JP); Yoshiaki Eguchi, Machida (JP)

(73) Assignee: Hitachi, Ltd., Tokyo (JP)

( * ) Notice: Subject to any disclaimer, the term of this patent is extended or adjusted under 35 U.S.C. 154(b) by 154 days.

(21) Appl. No.: 10/231,192

(22) Filed: Aug. 30, 2002

(65) Prior Publication Data

US 2003/0177330 A1 Sep. 18, 2003

(30) Foreign Application Priority Data

Mar. 13, 2002 (JP) ........................................ 2002-067826

(51) Int. Cl.[7] ................................................ G06F 12/10
(52) U.S. Cl. ........................................ 711/202; 711/206
(58) Field of Search ................................ 709/213, 214; 711/114, 148, 206, 202

(56) References Cited

U.S. PATENT DOCUMENTS 5,606,684 A * 2/1997 Nakano et al. ............. 711/114
6,516,389 B1 * 2/2003 Uchihori ..................... 711/137
2002/0112113 A1 * 8/2002 Karpoff et al. ................ 711/4
2002/0156984 A1 * 10/2002 Padovano ................... 711/148
2002/0188711 A1 * 12/2002 Meyer et al. ............... 709/223
2003/0131182 A1 * 7/2003 Kumar et al. .................. 711/5
2003/0172149 A1 * 9/2003 Edsall et al. ................ 709/224
2003/0236945 A1 * 12/2003 Nahum ....................... 711/114

OTHER PUBLICATIONS

The Evaluator Series. Virtualization of Disk Storage, WP–0007–1, Sep. 2000.
An analytic behavior model for disk drives with readahead caches and request reordering, 1998 ACM 0–89791–982–3/98/0006.
JP–A–2001–350669.

* cited by examiner

*Primary Examiner*—Hiep T. Nguyen
(74) *Attorney, Agent, or Firm*—Mattingly, Stanger, Malur & Brundidge, P.C.

(57) ABSTRACT

In the present invention, a management server manages, as virtual data areas, the physical data areas that storage devices have. Moreover, the management server includes a unit. Based on an access request received from each server, the unit issues, to the corresponding storage devices, an instruction of reading out the data onto caches from disks. Also, each storage device, which has received the instruction, includes each unit for reading out the data onto each cache in accordance with the instruction.

15 Claims, 10 Drawing Sheets

MAPPING INFORMATION

200 STORAGE DEVICE INFORMATION

| STORAGE DEVICE IDS (202) | STORAGE DEVICE ADDRESSES (204) | CACHE SIZES (206) |
|---|---|---|
| S01 | 10002000 | 1073741824 |
| S02 | 20004000 | 1073741824 |
| ⋮ | ⋮ | ⋮ |

210 VIRTUAL VOLUME INFORMATION

| VIRTUAL VOLUME IDS (212) | VIRTUAL BLOCK ADDRESSES (214) | STORAGE DEVICE IDS (216) | LOGICAL UNIT NUMBERS (218) | LOGICAL BLOCK ADDRESSES (220) |
|---|---|---|---|---|
| VVOL1 | 0 | S01 | 0 | 0 |
| | 1 | S01 | 0 | 1 |
| | 2 | S01 | 0 | 2 |
| | ⋮ | ⋮ | ⋮ | ⋮ |
| VVOL2 | 0 | S02 | 2 | 4000 |
| | 1 | S02 | 2 | 4001 |
| | 2 | S02 | 2 | 4002 |
| | ⋮ | ⋮ | ⋮ | ⋮ |
| ⋮ | ⋮ | ⋮ | ⋮ | ⋮ |

| SERVER IDS | PROCESS IDS | VIRTUAL VOLUME IDS | HEAD VIRTUAL-BLOCK ADDRESSES | BOTTOM VIRTUAL-BLOCK ADDRESSES | TIME INFORMA-TION |
|---|---|---|---|---|---|
| SV01 | 34094 | VVOL1 | 0 | 15 | 12097752 |
| SV03 | 12227 | VVOL2 | 100 | 149 | 12097763 |
| SV01 | 34094 | VVOL1 | 16 | 31 | 12099025 |
| ⋮ | ⋮ | ⋮ | ⋮ | ⋮ | ⋮ |

READ-OUT HISTORY INFORMATION

300

322 324 326 328

| VIRTUAL VOLUME IDS | HEAD VIRTUAL-BLOCK ADDRESSES | BOTTOM VIRTUAL-BLOCK ADDRESSES | TIME INFORMA-TION |
|---|---|---|---|
| VVOL4 | 320 | 479 | 12013592 |
| VVOL3 | 4000 | 4255 | 12048811 |
| VVOL1 | 80 | 159 | 12100785 |
| ⋮ | ⋮ | ⋮ | ⋮ |

320

READAHEAD HISTORY INFORMATION

ACCESS HISTORY INFORMATION

COMPUTER SYSTEM

BACKGROUND OF THE INVENTION

The present invention relates to a system for managing the data areas of storage devices as virtual data areas.

In recent years, the data amount stored into a storage device has been increased exceedingly. Moreover, the storage capacity of the storage device itself, and the number of storage devices, file servers, or the like which are to be connected to a SAN (: Storage Area Network) have also been increased. As a result, there have appeared the following various problems: The complication in management of the storage areas or the like that have had large capacities now, the complication in management of the storage devices set up at distributed locations, the load concentration on the storage devices, and the like. At present, with the objective of solving these problems, the research and development of a technology referred to as "virtualization" is being carried out.

As is described in the white paper "Virtualization of Disk Storage" (WP-0007-1), which Evaluator Group, Inc. had published in September 2000, the virtualization technology is basically classified into three types.

The first type is as follows: The respective servers coupled to a SAN have shared information for managing the storage areas of storage devices coupled to the SAN. In addition, each server accesses the storage devices, using each volume manager that each server has.

The second type is a system configuration referred to as "In-band Virtualization". In this configuration, a management server manages, collectively as virtual data areas (which, hereinafter, will be referred to as "virtual volumes"), the storage areas of the storage devices coupled to the SAN. Furthermore, the management server receives an access request to the storage devices from each server, thereby accessing the storage areas of the storage devices under the control and then sending back the result to each server.

The third type is a system configuration referred to as "Out-band Virtualization". In this configuration as well, the management server collectively manages the storage areas of the storage devices coupled to the SAN. However, when the management server receives the access request to the storage devices from each server, the management server sends back, to each server, position information on a storage area where the data has been actually stored. Then, based on the sent-back information, each server accesses the storage area of the storage devices.

The mainstream structure of a storage device is now a structure where a magnetic disk circular-plate is used as the recording medium. When the magnetic disk circular-plate is used as the recording medium, the following factors become problems: A time needed for the data seek on the magnetic disk, and a time needed for the data transfer from the magnetic disk.

In view of this situation, the data readahead scheme has been implemented. In this scheme, a cache memory is provided inside the storage device. Moreover, data that a host will request, especially data that will be read out consecutively (i.e., sequential data), is predicted. Furthermore, the predicted data is read out onto the cache memory in advance. The present technique has been described in a thesis "An analytic behavior model for disk drives with readahead caches and request reordering" published in "ACM SIGMETRICS '98", pp. 182–191. This data readahead conceals the above-described factors, i.e., the time needed for the data seek on the magnetic disk and the time needed for the data read-out from the magnetic disk, thereby allowing an enhancement in the data read-out performance. The present technique will be referred to as "data readahead processing".

SUMMARY OF THE INVENTION

The above-described data readahead technology is a technology that is effective in a single-body storage device. In a virtualization environment, however, the data areas on one storage device or a plurality of storage devices are managed collectively as virtual volumes. Consequently, the data to be read out is not necessarily stored on one storage device. In this situation, it is difficult to perform a data readahead using the same method as the data readahead method in the single-body storage device.

SUMMARY OF THE INVENTION

The present invention has been devised in order to solve the above-described problem. Accordingly, an object thereof is to provide a data readahead method under a virtualization environment and a data readahead carrying-out device and system thereunder.

In the present invention, a management server manages, as the virtual volumes, the physical storage areas that the storage devices have. Moreover, the management server includes a unit. Based on an access request received from each server, the unit issues, to the corresponding storage devices, an instruction of reading out the data onto the caches from the disks. Also, each storage device includes a unit for reading out the data onto each cache in accordance with the instruction.

Other objects, features and advantages of the invention will become apparent from the following description of the embodiments of the invention taken in conjunction with the accompanying drawings.

BRIEF DESCRIPTION OF THE DRAWINGS

FIG. 2 is a diagram for illustrating a configuration example of mapping information that a management server has;

FIG. 3 is a diagram for illustrating a configuration example of access history information that the management server has;

DESCRIPTION OF THE EMBODIMENTS

Hereinafter, the explanation will be given below concerning the embodiments of the present invention. Incidentally, the present invention is not limited by these embodiments.

First, referring to FIG. 1 to FIG. 6, the explanation will be given below regarding a 1st embodiment. Additionally, in the present embodiment, the Out-band Virtualization environment is selected as the target.

Figure 1:
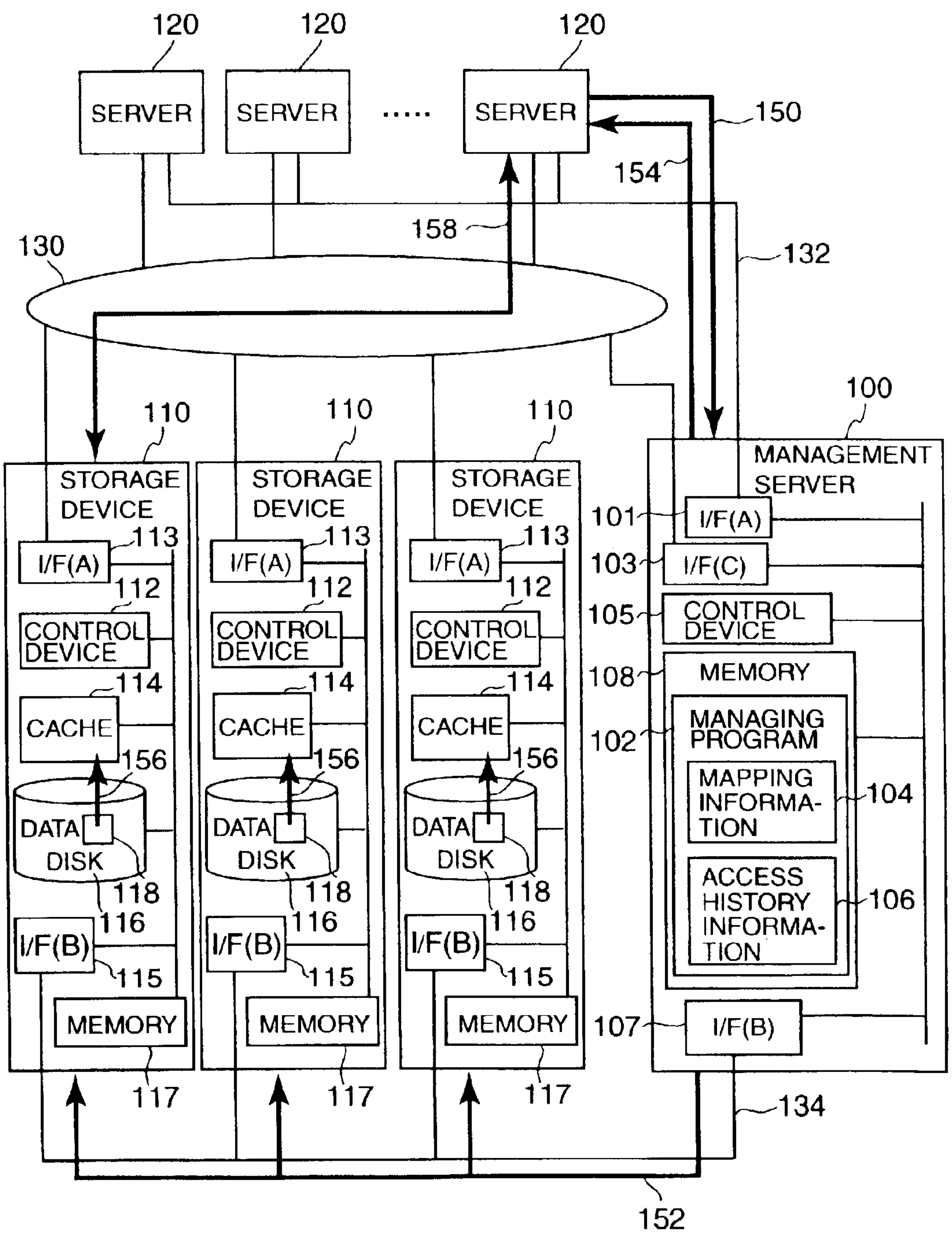
FIG. 1 is a diagram for illustrating an embodiment of the system configuration to which the present invention has been applied.

FIG. 1 is a diagram for illustrating the 1st embodiment of the system to which the present invention has been applied. The present system includes the following configuration components: A management server 100, storage devices 110, servers 120, a network 130 for coupling these components to each other, a special-purpose network 132 for coupling the management server 100 to each server 120, and a special-purpose network 134 for coupling the management server 100 to the respective storage devices 110. Incidentally, the storage devices 110 and the servers 120 to be coupled to the network 130 may be singular or plural in number.

The communications between the management server 100 and each server 120 and the communications between the management server 100 and the respective storage devices 110 are performed via the special-purpose network 132 and the special-purpose network 134, respectively. Also, the data transfers between each server 120 and the respective storage devices 110 are performed via the network 130. Configuring the system in this manner allows later-described information to be transmitted/received by using the special-purpose networks 132 and 134, i.e., without using the network 130. Here, the later-described information refers to a virtual-address converting instruction 400, physical address information 420, and an on-cache instruction 450. This condition reduces the traffic on the network 130.

The management server 100 includes the following configuration components: An I/F(A) 101 coupled to the special-purpose network 132, an I/F(C) 103 coupled to the network 130, a control device 105, a memory 108, and an I/F(B) 107 coupled to the special-purpose network 134. The memory 108 has stored a managing program 102, mapping information 104, and access history information 106. The control device 105 in the management server 100 executes the managing program 102 in order to manage, as virtual volumes, i.e., virtual storage areas, the physical storage areas of the storage devices 110 coupled to the network 130.

Each storage device 110 includes the following configuration components: An I/F(A) 113 coupled to the network 130, a control device 112, a cache 114, a disk device 116, an I/F(B) 115 coupled to the special-purpose network 134, and a memory 117. The control device 112 controls the cache 114 and the disk device 116, thereby, based on a request from each server 120, performing a data write-in/data read-out into/from a designated physical storage area.

Incidentally, although, in the present drawing, the disk device 116 is illustrated as a single-body disk device, the disk device 116 may be plural in number like, e.g., the RAID. In the latter case, the control device 112 manages correspondence relationships between a plurality of disk devices 116 within each storage device 110 and the physical storage areas. Also, the physical storage areas that each storage device 110 provides may be in a one-to-one correspondence with the plurality of disk devices 116. Otherwise, the plurality of disk devices 116 may correspond to one physical storage area. The arrows 150, 152, 154, 156, and 158 in FIG. 1 visually indicate the processing at the time when a server 120 accesses data on the storage devices 110. Additionally, hereinafter, virtual data areas that can be identified by virtual volume IDs and virtual block addresses, and the addresses of the virtual data areas will be referred to as "virtual blocks" and "virtual addresses", respectively. Also, physical data areas that can be identified by storage device addresses, logical unit numbers, and logical block addresses, and the addresses of the physical data areas will be referred to as "physical blocks" and "physical addresses", respectively.

When accessing the data on the storage devices 110, the server 120, at first, transmits the virtual-address converting instruction 400 to the management server 100 in order to acquire the physical address of the data on the access target (arrow 150).

The I/F(A) 101 of the management server 100 receives the virtual-address converting instruction 400 from the server 120. Moreover, the control device 105 executes the managing program 102 to make reference to the mapping information 104, thereby acquiring the physical address corresponding to a virtual address designated by the instruction 400. In addition, the management server 100 sends back the physical address information 420, which is information on the acquired physical address, to the server 120 of the request source via the I/F(A) 101 (arrow 154). Furthermore, the server 120, which has received the physical address information 420 from the management server 100, accesses the data on the storage devices 110, using the physical address included in the information 420 (arrow 158).

The control device 105 in the management server 100 further executes the managing program 102, thereby judging whether or not the data access this time is a data read-out. This judgment is made based on the information that the above-described received virtual-address converting instruction 400 has. If the data access is judged to be the data read-out, the management server 100 issues the on-cache instruction 450 from the I/F(B) 107 to the storage devices 110 that have stored the data to be read out (arrow 152). Also, the control device 105 in the management server 100 makes reference to the access history information 106, thereby judging whether or not the data access this time is a portion of a read-out of consecutive data. If the data access is judged to be the portion of the read-out of the consecutive data, the control device 105 in the management server 100 acquires the physical addresses corresponding to virtual blocks where there exists a fixed amount of data that follows the data to be read out this time. Moreover, the control device 105 issues the on-cache instruction 450 from the I/F(B) 107 to all of the storage devices 110 concerned therewith (arrow 152).

The I/F(B)s 115 of the storage devices 110 receive the on-cache instruction 450 from the management server 100. Furthermore, the control devices 112 control the disk devices 116 and the caches 114, thereby reading out the data 210, which has been designated by the on-cache instruction 450, from the disk devices 116 onto the caches 114 (arrows 156).

FIG. 2 is a diagram for illustrating a configuration example of the mapping information 104 stored in the memory 108 of the management server 100. The mapping information 104 includes the following information: Storage device information 200 which is information on the respective storage devices 110 that the management server 100 manages, and the virtual volume information 210 for making the virtual blocks and the physical blocks related to each other. Incidentally, although, in the present embodiment, both the virtual areas and the physical areas are managed in the unit of "the block", the management may also be performed in some other unit, e.g., by employing several blocks as one management unit in batch.

The storage device information 200 includes the following information: The storage device IDs 202 for identifying the respective storage devices 110 that the management server 100 manages, storage device addresses 204 for indicating device addresses of the respective storage devices 110 on the network 130, and cache sizes 206 for indicating storage capacities of the caches 114 that the respective storage devices 110 have.

The virtual volume information 210 includes the following information: The virtual volume IDs 212 for identifying the respective virtual volumes, the virtual block addresses 214 for indicating positions of the virtual blocks within the respective virtual volumes, the storage device IDs 216 for indicating the respective storage devices 110 that have the physical blocks corresponding to the respective virtual blocks, and the logical unit numbers 218 and the logical block addresses 220 for indicating the respective physical blocks. Incidentally, in FIG. 2, the following example has been given: A storage device S01 has physical blocks corresponding to virtual blocks within a virtual volume VVOL1, and a storage device S02 has physical blocks corresponding to virtual blocks within a virtual volume VVOL2. One storage device, however, may have physical blocks corresponding to a plurality of virtual volumes.

FIG. 3 is a diagram for illustrating a configuration example of the access history information 106 stored in the memory 108 of the management server 100.

The access history information 106 includes the following information: Read-out history information 300, i.e., history information on the virtual-address converting instructions 400 issued with the objective of the data read-out, and readahead history information 320, i.e., history information on readahead directions in the case where storage areas from which the read-out have been performed soon are predicted so as to direct the readahead.

The read-out history information 300 includes the following information: Server IDs 302 for identifying a server 120 that had issued the virtual-address converting instruction 400, process IDs 304 for indicating the process within the server 120 that had issued the instruction 400, virtual volume IDs 306 for indicating a virtual volume to which data on the readout target belongs, head virtual-block addresses 308 for indicating the head virtual block of the read-out target data, bottom virtual-block addresses 310 for indicating the bottom virtual block of the read-out target data, and time information 312 on the time at which the instruction 400 had been received.

The readahead history information 320 includes the following information: Virtual volume IDs 322 for identifying a virtual volume to which read-ahead data belongs, head virtual-block addresses 324 for indicating the head virtual block of the read-ahead data, bottom virtual-block addresses 326 for indicating the bottom virtual block of the read-ahead data, and time information 328 for indicating the issuing time of the on-cache instruction 450 issued for the readahead.

Figure 4A:
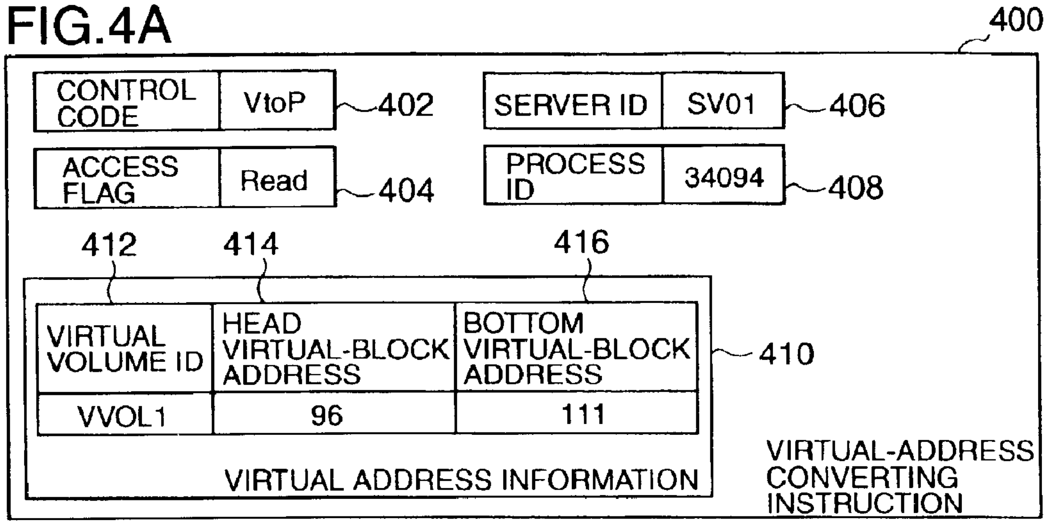
FIG. 4A, FIG. 4B, and FIG. 4C are diagrams for illustrating a configuration example of a virtual-address converting instruction which a server issues to the management server, that of physical address information which the management server transmits to the server, and that of an on-cache instruction which the management server issues to storage devices, respectively.
Figure 4B:
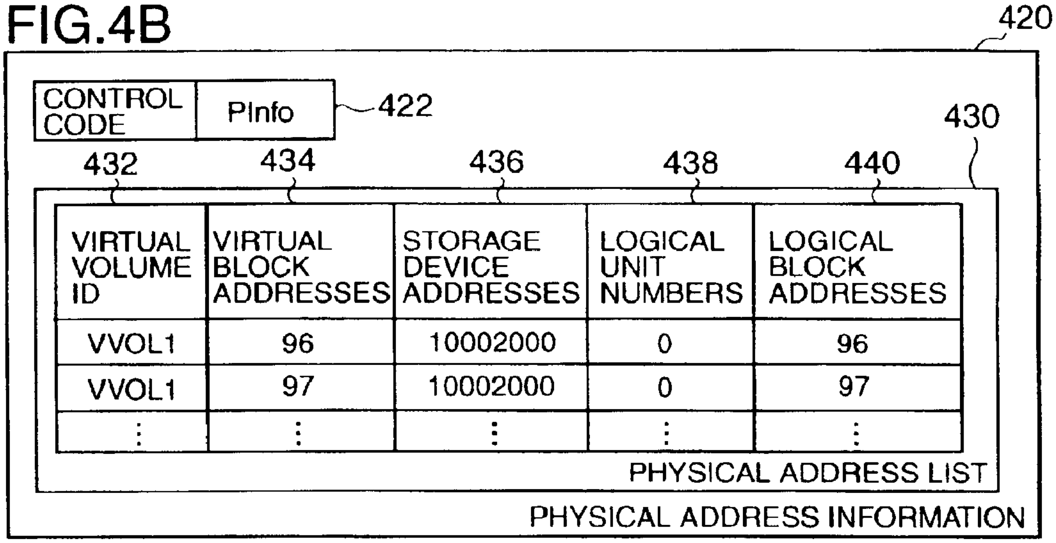
Figure 4C:
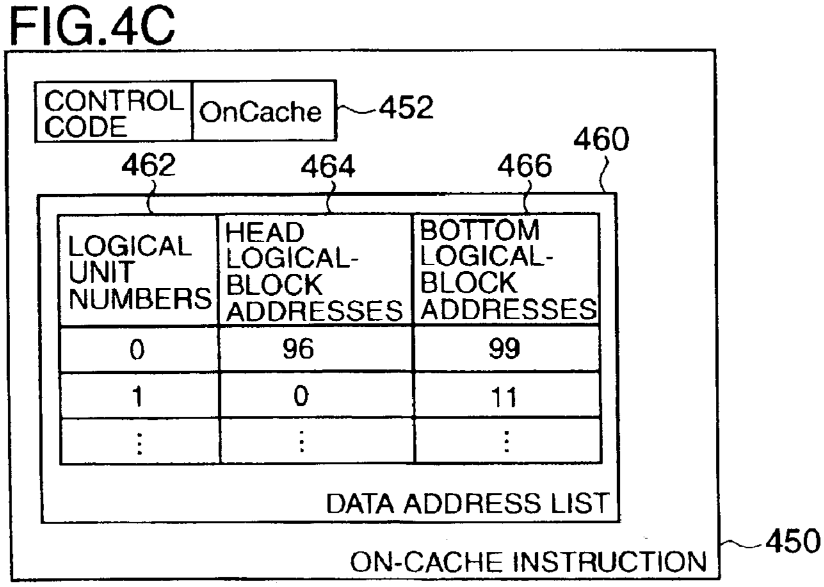

FIG. 4A, FIG. 4B, and FIG. 4C are diagrams for illustrating a configuration example of the virtual-address converting instruction 400 which a server 120 issues to the management server 100, that of the physical address information 420 which the management server 100 transmits to the server 120, and that of the on-cache instruction 450 which the management server 100 issues to the storage devices 110, respectively.

The virtual-address converting instruction 400 includes the following information: A control code 402 for identifying the instruction 400, an access flag 404 for indicating whether the data access request based on the instruction 400 is a data read-out request or a data write-in request, a server ID 406 for identifying the server 120 that had issued the instruction 400, a process ID 408 for indicating the process within the server 120 that had issued the instruction 400, and virtual address information 410 for indicating the virtual address of data that becomes the access target.

The virtual address information 410 includes the following information: A virtual volume ID 412 for indicating the virtual volume to which the data on the access target belongs, a head virtual-block address 414 for indicating the head virtual block of the access target data, and a bottom virtual-block address 416 for indicating the bottom virtual block of the access target data.

The physical address information 420 includes the following information: A control code 422 for identifying the information 420, and a physical address list 430, i.e., a list of physical addresses corresponding to virtual addresses designated by the virtual-address converting instruction 400.

The physical address list 430 includes the following information: Virtual volume IDs 432 and the virtual block addresses 434 designated by the virtual-address converting instruction 400 respectively, storage device addresses 436, i.e., the physical addresses corresponding to the virtual addresses, logical unit numbers 438, and logical block addresses 440.

The on-cache instruction 450 includes the following information: A control code 452 for identifying the instruction 450, and a data address list 460 for specifying data to be read out onto the caches 114.

The data address list 460 includes the following information: Logical unit numbers 462 that have stored the data on the read-out target, head virtual-block addresses 464 for indicating the head virtual blocks of the read-out target data, and bottom virtual-block addresses 466 for indicating the bottom virtual blocks of the read-out target data.

Figure 5:
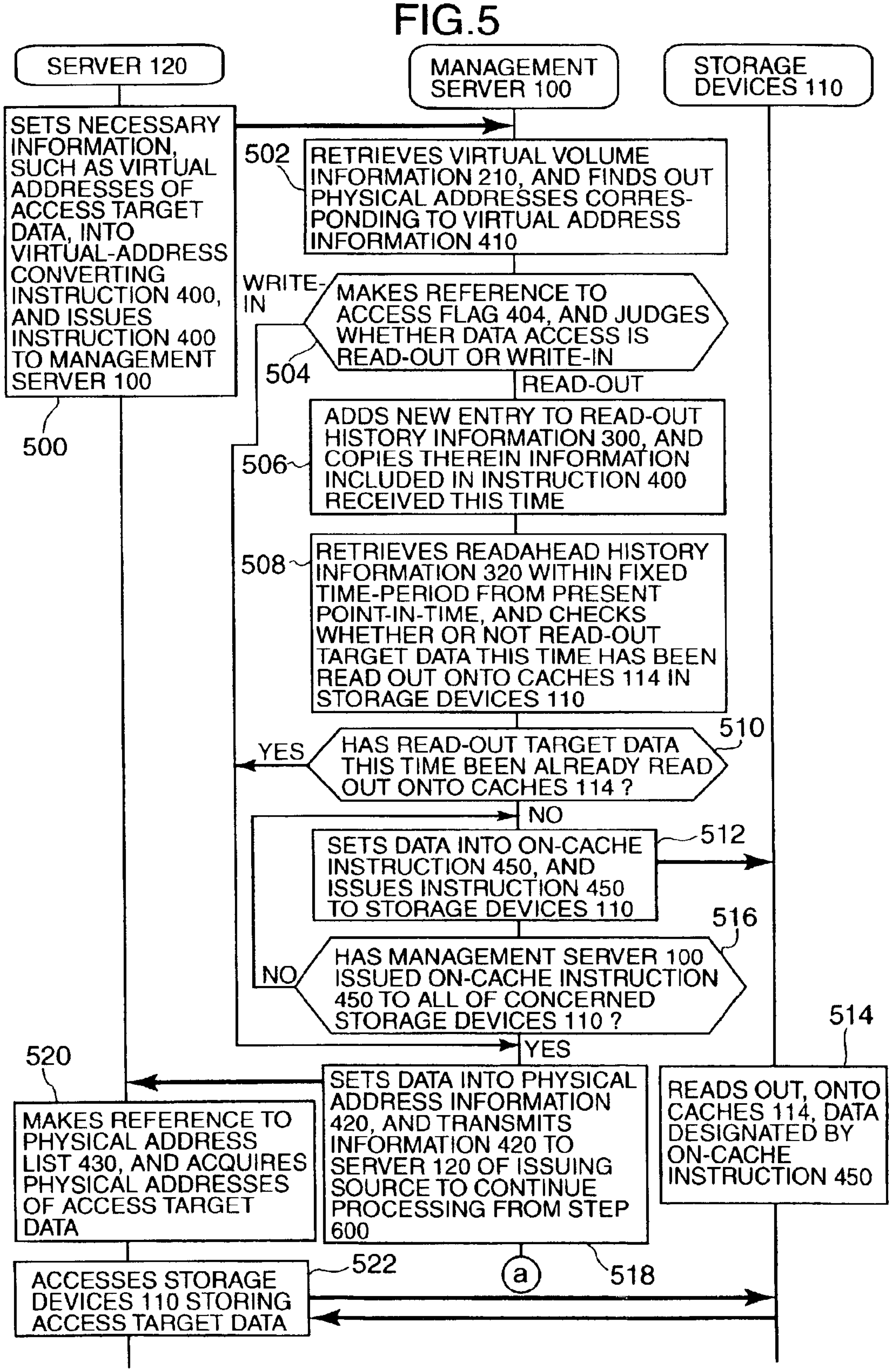
FIG. 5 is a diagram for illustrating an example of a data access processing.
Figure 6:
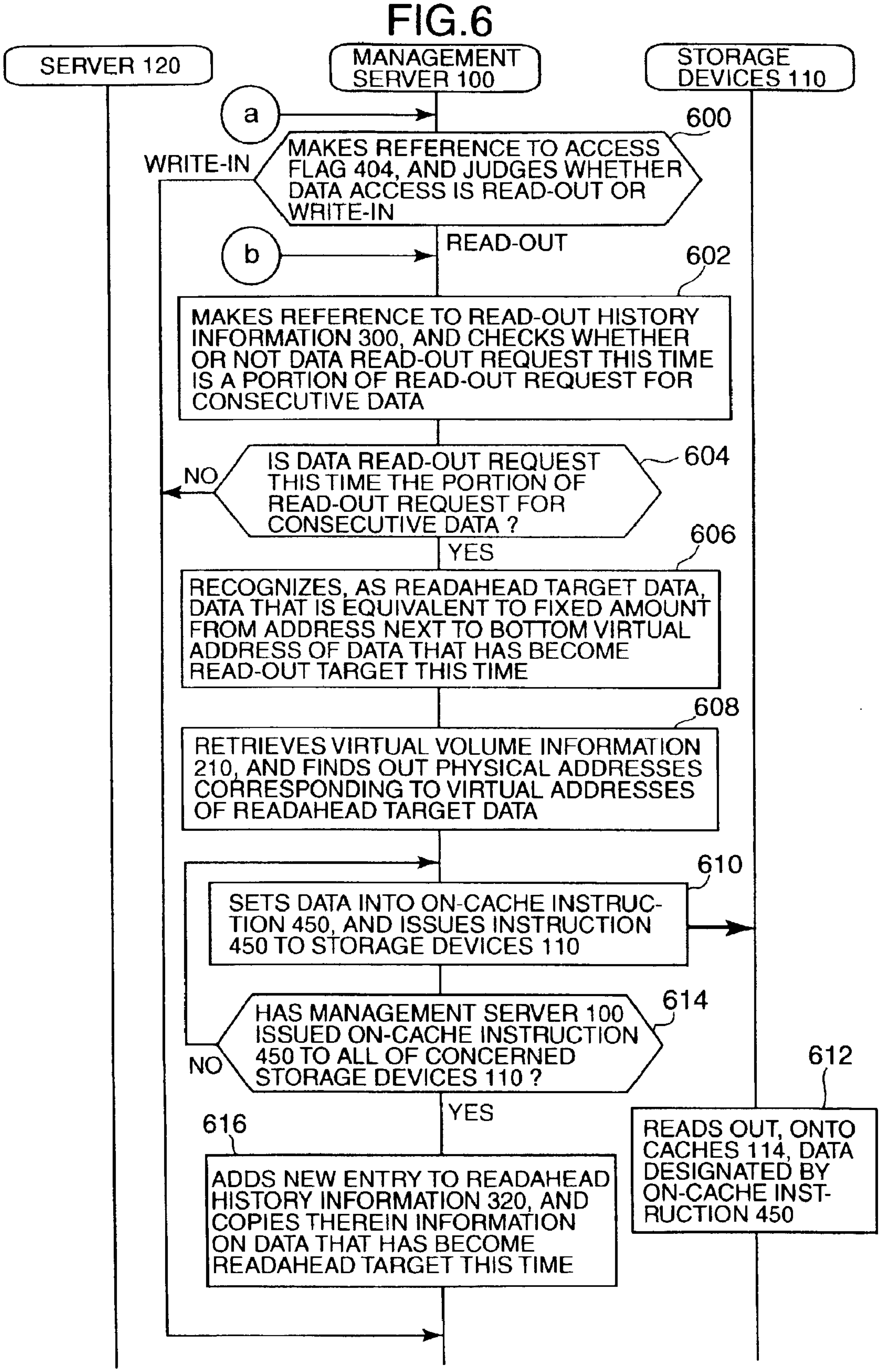
FIG. 6 is a diagram for illustrating another example of the data access processing.

FIG. 5 and FIG. 6 are diagrams for illustrating the flow of a processing of the data access in the 1st embodiment. Hereinafter, the explanation will be given below concerning an operation at the time when a server 120 reads out or writes in data from/into the storage devices 110. Here, the processing that the management server 100 will execute is a processing that the control device 105 performs by executing the managing program 102 stored in the memory 108. Incidentally, FIG. 5 and FIG. 6 illustrate an example where the readahead processing is performed in both of the following two cases: The case where the access flag 404 within the virtual-address converting instruction 400 indicates a data read-out, i.e., the case where the data access request from the server 120 is a data read-out, and the case where the control device 105 predicts that the data read-out request from the server 120 will be a portion of a read-out request for consecutive data. It may be assumed, however, that the readahead processing is performed only in either of the two cases.

The server 120 sets information necessary for the virtual-address converting instruction 400, then transmitting the information to the management server 100 (step 500). Here, the information to be set refers to the following information: The control code 402 for indicating that the instruction 400 is a virtual-address converting instruction, the access flag 404 for indicating whether the data access is a data read-out or a data write-in, the server ID 406 for indicating the server 120 that had issued the instruction 400, the process ID 408 for indicating the process in which the instruction 400 had been issued, the virtual volume ID 412 to which data on the access target belongs, the head virtual-block address 414 of the access target data, and the bottom virtual-block address 416 thereof.

Having received the virtual-address converting instruction 400, the management server 100 retrieves the virtual volume information 210, thereby finding out the storage device IDs 216, the logical unit numbers 218, and the logical block addresses 220 corresponding to the virtual block address designated by the virtual address information 410 within the instruction 400. Also, the management server 100 retrieves the storage device information 200 using, as the key, the storage device IDs 216 found out by the above-described retrieval, thereby acquiring the storage device addresses 204 of the storage devices 110 on the network 130 (step 502).

The management server 100 makes reference to the access flag 404 within the virtual-address converting instruction 400, thereby judging whether the data access request is a data read-out or a data write-in. If the request is judged to be the data read-out, the server 100 continues the processing from a step 506. If the request is judged to be the data write-in, the server 100 continues the processing from a step 518 (step 504).

The management server 100 adds a new entry to the read-out history information 300. Moreover, the server 100 copies the server ID 406, the process ID 408, the virtual volume ID 412, the head virtual-block address 414, and the bottom virtual-block address 416, which have been included within the virtual-address converting instruction 400, into a server ID 302, a process ID 304, a virtual volume ID 306, a head virtual-block address 308, and a bottom virtual-block address 310 within the new added entry, respectively, then setting, into the time information 312, the time at which the instruction 400 had been received (step 506).

The management server 100 retrieves the readahead history information 320 from the present point-in-time to a predetermined time-period ago, thereby checking whether or not the data that becomes the read-out target this time has been already read out onto the caches 114 in the storage devices 110 by a previous readahead processing (step 508).

If the data that becomes the read-out target this time has been already read out onto the caches 114, the server 100 continues the processing from the step 518. If not, the server 100 continues the processing from a step 512 (step 510).

For each storage device 110 found out at the step 502, the management server 100 sets information necessary for the on-cache instruction 450, then issuing the on-cache instruction 450 on each concerned storage-device 110 basis (step 512). Here, the information to be set refers to the following information: The control code 452 for indicating that the instruction 450 is an on-cache instruction, and the information within the data address list 460 for specifying physical positions where the data on the read-out target has been actually stored. Additionally, the logical unit numbers 218 and the logical block addresses 220 found out at the step 502 are set into the logical unit numbers 462 within the data address list 460 and the head virtual-block addresses 464 and the bottom virtual-block addresses 466 within the logical units. If the read-out target data has been stored in a state of being distributed into a plurality of logical units, information on all of the logical units and the physical blocks concerned is set into the data address list 460. Also, the management server 100 may broadcast the on-cache instruction 450 to all of the storage devices 110 coupled to the special-purpose network 134, using the special-purpose network 134. Otherwise, the management server 100 may transmit the on-cache instruction 450 on each storage-device 110 basis by designating each address of each storage device 110 on the special-purpose network 134.

Having received the on-cache instruction 450, the storage devices 110 read out, onto the caches 114, the data included in all of the physical blocks designated by the data address list 460 (step 514).

The management server 100 judges whether or not the server 100 has issued the on-cache instruction 450 to all the concerned storage devices 110. If the server 100 has issued the instruction 450 thereto, the server 100 continues the processing from the step 518. If not, the server 100 continues the processing from the step 512 (step 516).

The management server 100 sets, into the physical address information 420, the physical addresses found out at the step 502, and transmits the physical address information 420 to the server 120, i.e., the issuing source of the virtual-address converting instruction 400 (step 518).

Having received the physical address information 420, the server 120 acquires, from the physical address list 430, the addresses of all the storage devices 110 that have stored the data on the access target and the physical block addresses of the access target data (step 520).

Based on the information acquired at the step 520, the server 120 accesses the storage devices 110 that have stored the access target data (step 522).

The management server 100 makes reference to the access flag 404 within the received virtual-address converting instruction 400, thereby judging whether the object of the data access request is the data read-out or the data write-in. If the object is judged to be the data read-out, the server 100 continues the processing from a step 602. If the object is judged to be the data write-in, the server 100 terminates the processing (step 600).

The management server 100 retrieves the read-out history information 300, thereby checking whether or not the data read-out request this time is a portion of a read-out request for consecutive data (step 602). Here, the judgement as to whether or not the read-out request this time is a portion of a read-out request for consecutive data is performed as follows, for example: The read-out history information 300 has stored history information on the data read-out that the servers 120 have performed from the storage devices 110 until the present point-in-time. The management server 100 makes reference to the server IDs 302, the process IDs 304, and the time information 312 stored in the read-out history information 300. Then, if there exits the following read-out history, the management server 100 judges that the data read-out request this time is a portion of a read-out request for sequential and consecutive data: Within a predetermined time-period (e.g., from the present point-in-time to several seconds or minutes ago), the server and the process that are the same as those of the data read-out request received this time had read out data which exists in a virtual block within the same virtual volume. Furthermore, the server and the process consecutively read out data as well which exists in a virtual block that follows the above-described virtual block.

If the management server 100 has judged that the data read-out request this time is the portion of the read-out request for the consecutive data, the server 100 continues the processing from a step 606. If not, the server 100 terminates the processing (step 604).

The management server 100 recognizes, as data on the readahead target, virtual blocks that are equivalent to a fixed amount (e.g., the number of the blocks that will be read out at one-time read-out when reading out the consecutive data) from a virtual block that is the next to the bottom virtual block of the data that has become the read-out target this time (step 606).

The management server 100 retrieves the virtual volume information 210 so as to find out all of physical blocks corresponding to the respective virtual blocks of the above-described readahead target, thereby acquiring the following information: The storage device IDs 216 and the logical unit numbers 218 of the storage devices 110 that have the physical blocks, and the logical block addresses 220 of the physical blocks. Also, the management server 100 retrieves the storage device information 200 using, as the key, the acquired storage device IDs 216, thereby acquiring the storage device addresses 204 of the storage devices 110 that have the physical blocks (step 608).

For each storage device 110 that has the physical blocks found out at the step 608, the management server 100 sets information necessary for the on-cache instruction 450, then issuing the on-cache instruction 450 on each storage-device 110 basis (step 610). Here, the information to be set is basically the same as that set at the step 512.

Having received the on-cache instruction 450, the storage devices 110 read out, onto the caches 114, the data included in all of the physical blocks designated by the data address list 460 (step 612).

The management server 100 judges whether or not the server 100 has issued the on-cache instruction 450 to all the storage devices 110 concerned. If the server 100 has issued the instruction 450 thereto, the server 100 continues the processing from a step 616. If not, the server 100 continues the processing from the step 610 (step 614).

The management server 100 adds a new entry to the readahead history information 320. Moreover, the server 100 sets therein the virtual volume ID, the head virtual-block address, and the bottom virtual-block address of the data recognized as the readahead target this time, and the time at which the on-cache instruction 450 had been issued. At this point-in-time, the server 100 terminates the processing (step 616).

Incidentally, in the present embodiment, the management server 100 had issued the on-cache instruction 450 to the storage devices 110 before transmitting the physical address information 420 to each server 120. However, these two operations, i.e., the transmission of the physical address information 420 to each server 120 and the issuing of the on-cache instruction 450 to the storage devices 110, may be inverse or simultaneous in their order.

According to the 1st embodiment, under the Out-band Virtualization environment, the management server 100, based on the inquiry about the data access received from each server 120, is capable of directing the storage devices 110 to read out the concerned data from the disk devices 116 onto the caches 114. Consequently, each storage device 110 is capable of performing the data read-out processing with a high-efficiency.

Also, according to the 1st embodiment, when having received the above-described inquiry, the management server 100, based on the history information on the data read-out in the past, is capable of predicting storage areas from which a data read-out will be performed from now on. As a result, the server 100 is capable of directing the execution of the data readahead toward the storage devices 110 that have the concerned storage areas. Namely, with respect to the storage areas as well about which the management server 100 has not yet received the virtual-address converting instruction 400 from each server 120, the management server 100 is capable of directing the execution of the data readahead. Accordingly, under the Out-band Virtualization environment as well, each storage device 110 is capable of performing the data readahead processing with a high-efficiency, thereby making it possible to shorten the time needed for the read-out of the consecutive and sequential data.

As a consequence, in the virtualization environment, it becomes possible to conceal the time needed for the data seek on the disk device and the time needed for the data transfer from the disk device, thereby allowing the implementation of speeding-up of the data read-out processing.

Figure 7:
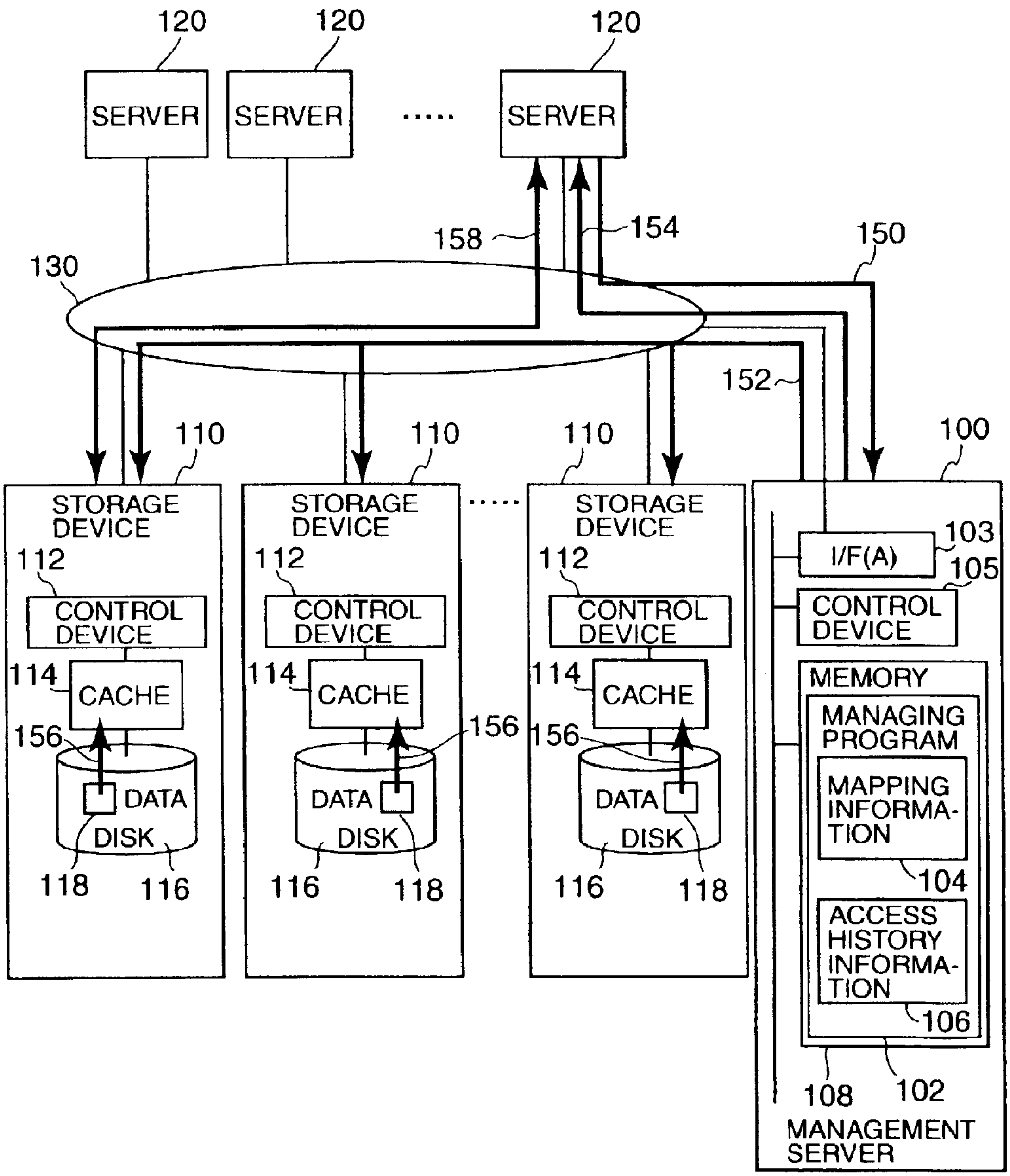
FIG. 7 is a diagram for illustrating another embodiment of the system configuration to which the present invention has been applied.

FIG. 7 is a diagram for illustrating a 2nd embodiment of the system to which the present invention has been applied. What differs from the 1st embodiment is a point that, in the 2nd embodiment, there exists none of the special-purpose network 132 for coupling the management server 100 to each server 120 and the special-purpose network 134 for coupling the management server 100 to each storage device 110. Accordingly, the communications between the management server 100 and each storage device 110, the communications between the management server 100 and each server 120, and the communications between each server 120 and each storage device 110 are all performed via the network 130. This condition, as compared with the 1st embodiment, increases the traffic on the network 130, however, makes it unnecessary to prepare the special-purpose networks 132 and 134 provided in the 1st embodiment. Additionally, similarly in the 1st embodiment, the processing in the case where each server 120 reads out or writes in data from/into the storage devices 110 is executed in accordance with the processing flow illustrated in FIG. 5 and FIG. 6. In the 2nd embodiment, however, it turns out that the management server 100 issues the on-cache instruction 450 to the storage devices 110 with the use of the network 130. Consequently, what differs from the 1st embodiment is also a point that the management server 100 designates the address of each storage device 110 on the network 130 so as to transmit the on-cache instruction 450 on each storage-device 110 basis.

According to the 2nd embodiment, when each server 120 reads out data from the storage devices 110, the management server 100 is capable of directing, via the network 130, the storage devices 110 to read out the data onto the caches 114. Accordingly, it becomes possible to perform a low-cost and high-efficiency data readahead processing.

Figure 8:
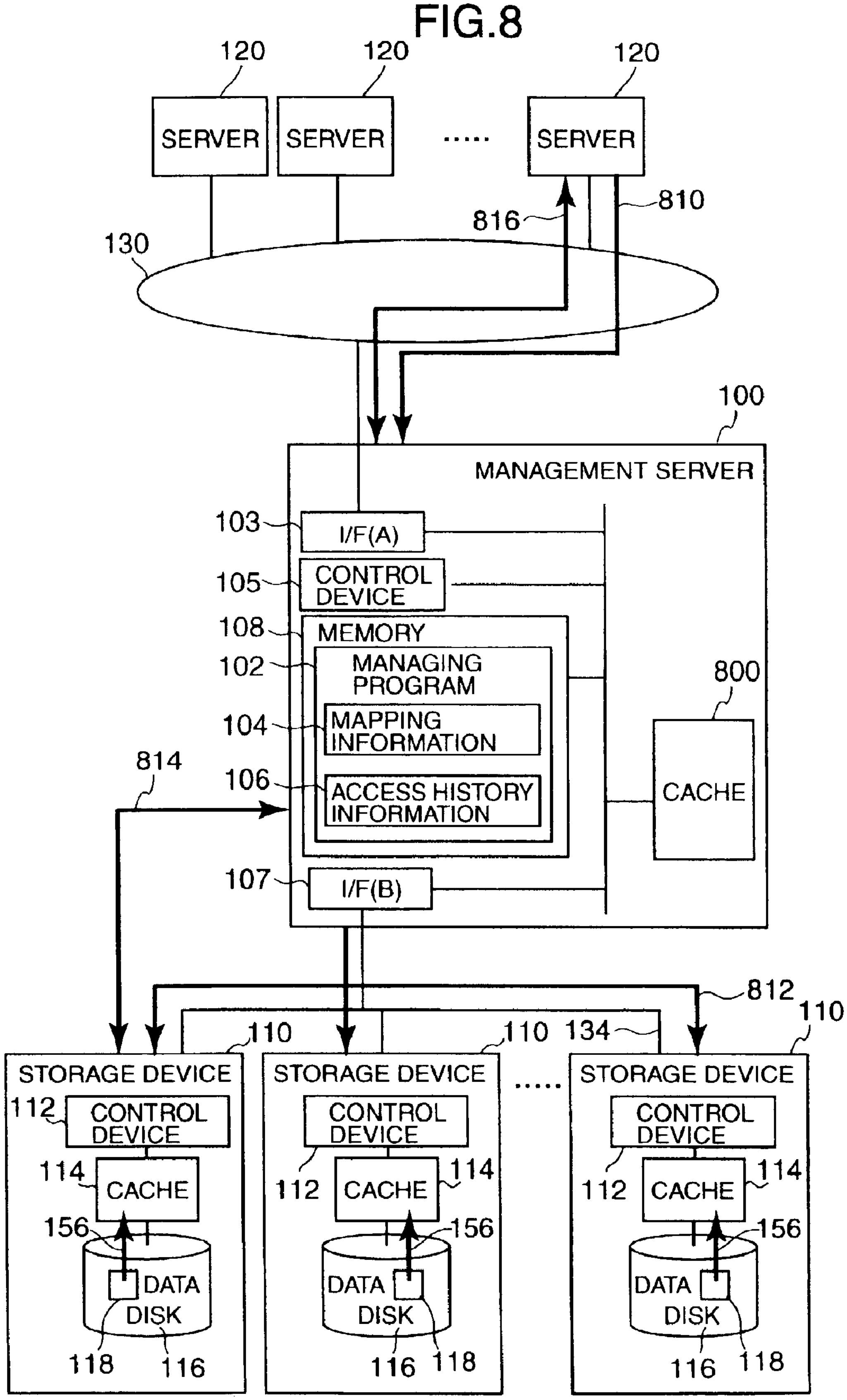
FIG. 8 is a diagram for illustrating still another embodiment of the system configuration to which the present invention has been applied.

FIG. 8 is a diagram for illustrating a 3rd embodiment of the system to which the present invention has been applied. In the present embodiment, the In-band Virtualization environment is selected as the target. The present embodiment differs from the 1st embodiment in its data access method. In the 3rd embodiment, a server 120 requests the management server 100 to make a data access. Then, in compliance with the request, the management server 100 accesses the data on the storage devices 110. Incidentally, in the present embodiment, the management server 100 has a cache 800 used for the data transmission/reception with the storage devices 110 and each server 120.

The arrows 810, 812, 814, and 816 in FIG. 8 visually indicate the data access method in the 3rd embodiment.

When accessing the data on the storage devices 110, the server 120 transmits a data access instruction 900 to the management server 100 (arrow 810). The management server 100, which has received the data access instruction 900 from the server 120, makes reference to the mapping information 104, thereby acquiring the physical address corresponding to a virtual address designated by the instruction 900. Also, from the information accompanying the instruction 900, the management server 100 judges whether the access request this time is a data write-in or a data read-out. In the former case, the management server 100 transfers data on the write-in target from the server 120 onto the cache 800 (arrow 816), then writing in the data into the physical block that the acquired physical address refers to (arrow 814). In the latter case, the management server 100 issues the on-cache instruction 450 to all of the storage devices 110 that have stored the data on the read-out target (arrow 812). Furthermore, the management server 100 reads out the data on the read-out target from the concerned storage devices 110 onto the cache 800 (arrow 814), then transmitting the data to the server 120 of the request source (arrow 816).

Figure 9:
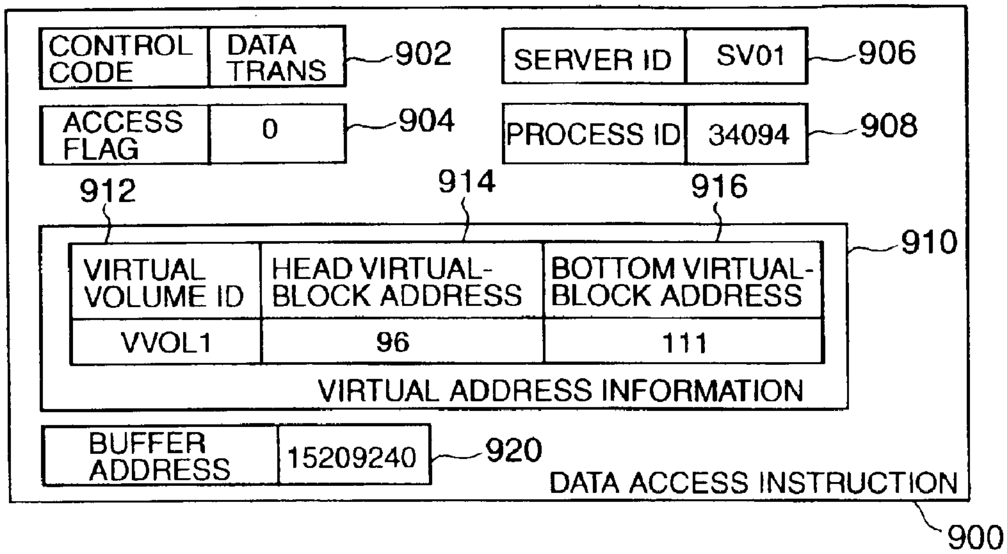
FIG. 9 is a diagram for illustrating a configuration example of a data access instruction that the server issues to the management server.

FIG. 9 is a diagram for illustrating a configuration example of the data access instruction 900 that the server 120 issues to the management server 100. The data access instruction 900 includes the following information: A control code 902 for identifying the instruction 900, an access flag 904 for indicating whether the data access based on the instruction 900 is a data read-out or a data write-in, a server ID 906 for identifying the server 120 that had issued the instruction 900, a process ID 908 for indicating the process within the server 120 that had issued the instruction 900, virtual address information 910 for indicating the virtual address of the data that becomes the access target, and a buffer address 920 for indicating the address of a buffer on the server 120 that becomes the transfer destination or the transfer source of the data on the access target.

The virtual address information 910 includes the following information: A virtual volume ID 912 for indicating the virtual volume to which the data on the access target belongs, a head virtual-block address 914 for indicating the head virtual block of the access target data, and a bottom virtual-block address 916 for indicating the bottom virtual block of the access target data.

Figure 10:
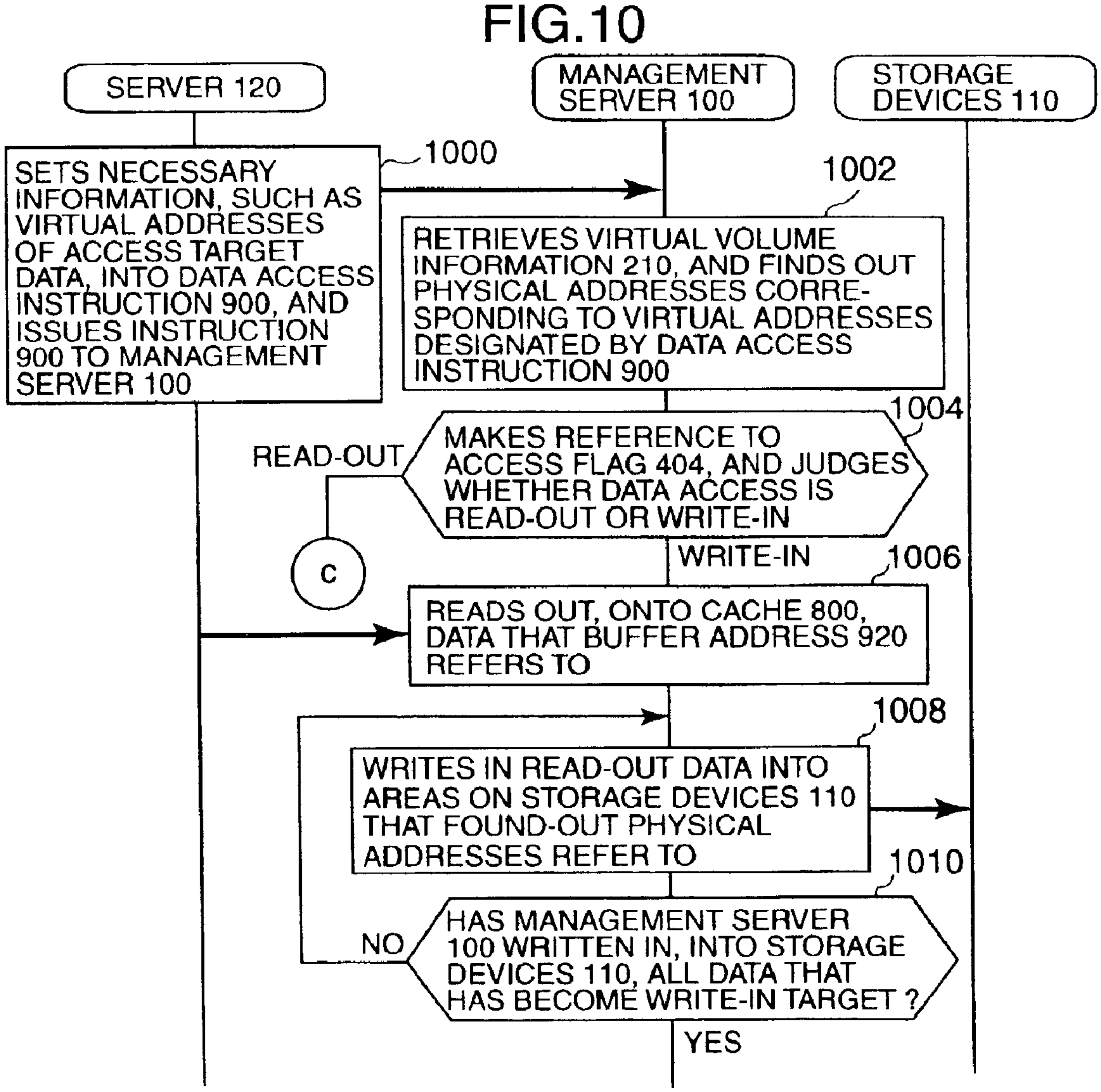
FIG. 10 is a diagram for illustrating still another example of the data access processing.
Figure 11:
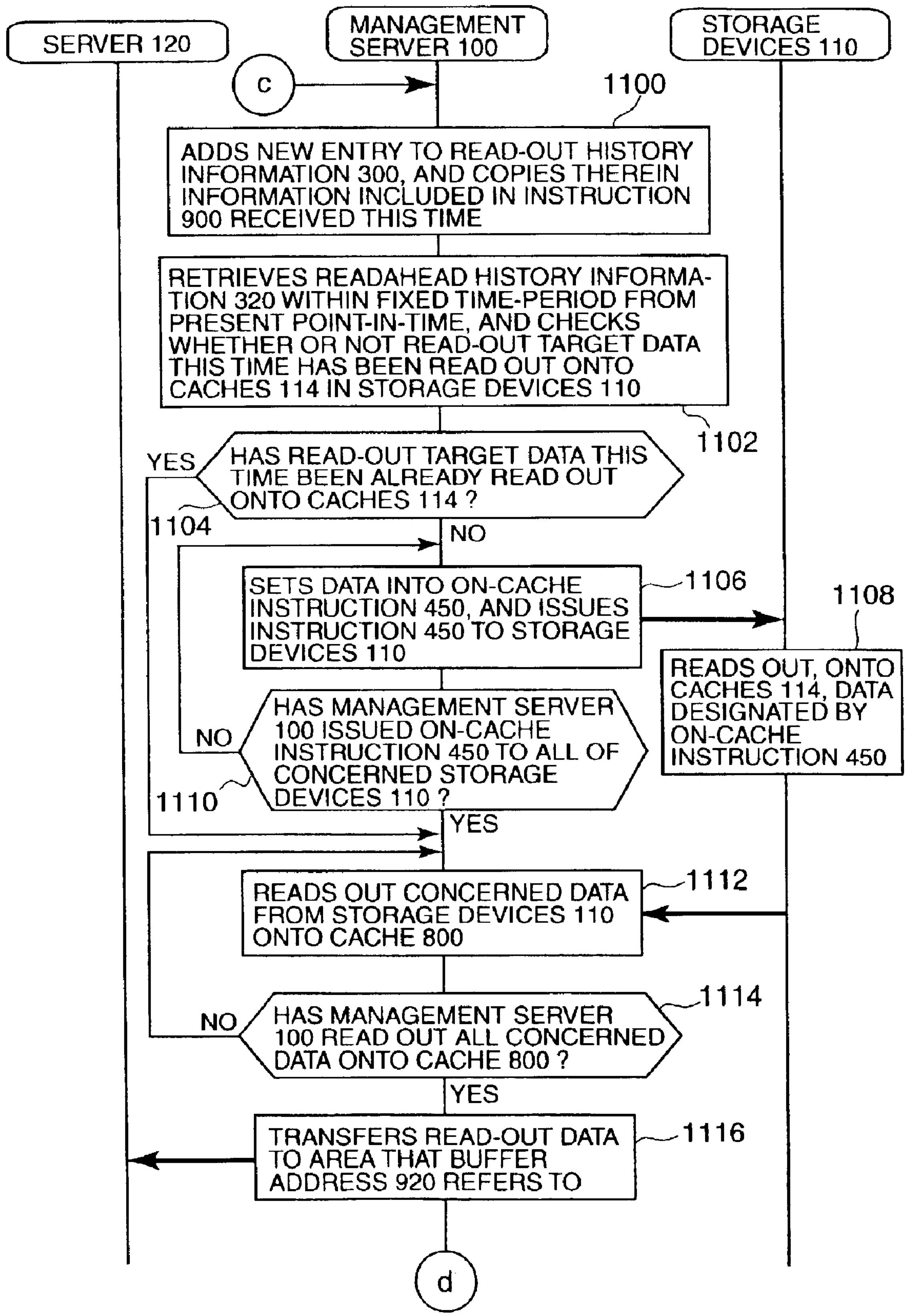
FIG. 11 is a diagram for illustrating an even further example of the data access processing.

FIG. 10 and FIG. 11 are diagrams for illustrating the flow of a processing of the data access in the 3rd embodiment. Hereinafter, the explanation will be given below concerning an operation at the time when, via the management server 100, a server 120 reads out data stored in the storage devices 110, or writes in data into storage areas on the storage devices 110. Additionally, the processing that the management server 100 will execute is a processing that the control device 105 in the management server 100 performs by executing the managing program 102 stored in the memory 108.

The server 120 sets information necessary for the data access instruction 900, then transmitting the information to the management server 100 (step 1000). Here, the information to be set refers to the following information: The control code 902 for indicating that the instruction 900 is a data access instruction, the access flag 904 for indicating whether the data access is a data read-out or a data write-in, the server ID 906 for indicating the server 120 that had issued the instruction 900, the process ID 908 for indicating the process in which the instruction 900 had been issued, the virtual volume ID 912 to which data on the access target belongs, the head virtual-block address 914 of the access target data, the bottom virtual-block address 916 thereof, and the buffer address 920 for indicating the address of the buffer on the server 120 that becomes the transfer destination or the transfer source of the data on the access target.

Having received the data access instruction 900, the management server 100 retrieves the virtual volume information 210 so as to find out all of physical blocks corresponding to the respective virtual blocks designated by the virtual address information 910 within the instruction 900, thereby acquiring the following information: The storage device IDs 216 and the logical unit numbers 218 of the storage devices 110 that have the physical blocks, and the logical block addresses 220 of the physical blocks. Also, the management server 100 retrieves the storage device information 200 using, as the key, the acquired storage device IDs 216, thereby acquiring the storage device addresses of the storage devices 110 that have the physical blocks (step 1002).

The management server 100 makes reference to the access flag 904 within the data access instruction 900, thereby judging whether the data access request is a data read-out or a data write-in. If the request is judged to be the data read-out, the server 100 continues the processing from a step 1100. If the request is judged to be the data write-in, the server 100 continues the processing from a step 1006 (step 1004).

The management server 100 transfers the data, onto the cache 800, from the buffer on the server 120 indicated by the buffer address 920 within the data access instruction 900 (step 1006).

Into the physical blocks found out at the step 1002, the management server 100 writes in the data transferred at the step 1006 (step 1008).

The management server 100 judges whether or not the server 100 has written in, into the storage devices 110, all the data that becomes the write-in target. If the server 100 has written in all the data therein, the server 100 terminates the processing. If not, the server 100 continues the processing from the step 1008 (step 1010).

The management server 100 adds a new entry to the read-out history information 300. Moreover, the server 100 copies the server ID 406, the process ID 408, the virtual volume ID 412, the head virtual-block address 414, and the bottom virtual-block address 416, which have been included within the data access instruction 900, into a server ID 302, a process ID 304, a virtual volume ID 306, a head virtual-block address 308, and a bottom virtual-block address 310 within the new entry, respectively, then setting, into the time information 312, the time at which the instruction 900 had been received (step 1100).

The management server 100 retrieves the readahead history information 320 within an arbitrary time-period from the present point-in-time, thereby checking whether or not the data that becomes the read-out target this time has been already read out onto the caches 114 in the storage devices 110 by a previous readahead processing (step 1102).

If the data that becomes the read-out target this time has been already read out onto the caches 114, the server 100 continues the processing from a step 1112. If not, the server 100 continues the processing from a step 1106 (step 1104).

For the respective storage devices 110 that have the physical blocks found out at the step 1002, the management server 100 sets information necessary for the on-cache instruction 450, then issuing the on-cache instruction 450 on each concerned storage-device 110 basis (step 1106). Here, the information to be set is basically the same as that set at the step 512 illustrated in FIG. 5. Having received the on-cache instruction 450, the storage devices 110 read out, onto the caches 114, the data included in the physical blocks designated by the data address list 460 (step 1108).

The management server 100 judges whether or not the server 100 has issued the on-cache instruction 450 to all the concerned storage devices 110. If the server 100 has issued the instruction 450 thereto, the server 100 continues the processing from the step 1112. If not, the server 100 continues the processing from the step 1106 (step 1110).

From the concerned storage devices 110 onto the cache 800 on the management server 100, the server 100 reads out the data that has become the read-out target this time (step 1112).

The management server 100 judges whether or not the server 100 has read out, onto the cache 800, all the data that has become the read-out target this time. If the server 100 has read out all the data thereon, the server 100 continues the processing from a step 1116. If not, the server 100 continues the processing from the step 1112 (step 1114).

Onto a data area on the server 120 indicated by the buffer address 920 within the data access instruction 900 received this time, the management server 100 transfers the data read out from the storage devices 110 onto the cache 800 (step 1116), then executing the processing illustrated in FIG. 6 from the step 602 in FIG. 6.

According to the 3rd embodiment, under the In-band Virtualization environment, the management server 100, based on the data access instruction 900 received from each server 120, is capable of directing the storage devices 110 to read out the data to be accessed from the disk devices 116 onto the caches 114. Consequently, it becomes possible to perform the data read-out processing with a high-efficiency.

Also, when having received the above-described data access instruction 900, the management server 100, based on the history information on the data read-out in the past, predicts storage areas that have stored data the read-out of which will be performed from now on. As a result, the server 100 directs the execution of the data readahead toward the storage devices 110 that have the concerned storage areas. Namely, with respect to the storage areas as well about which the management server 100 has not yet received the data access instruction 900 from each server 120, the management server 100 is capable of directing the execution of the data readahead. Accordingly, under the In-band Virtualization environment as well, each storage device 110 is capable of performing the data readahead processing with a high-efficiency, thereby making it possible to shorten the time needed for the read-out of the consecutive and sequential data.

According to the present invention, under the virtualization environment as well, it becomes possible to execute the data readahead processing.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A control server coupled to a server device and at least one storage device, comprising:

an interface unit coupled to said server device and said at least one storage device;

a memory device for storing correspondence relationships between physical storage areas and virtual volumes, wherein said physical storage areas being included in said at least one storage device, and said virtual volumes being virtual storage areas; and a control device for controlling said interface unit and said memory device, wherein said interface unit receives a request including an address of a virtual volume from said server device, wherein said control device converts said address of said virtual volume included in said request into an address of a physical storage area based on said correspondence relationships stored in said memory device, wherein said interface unit transmits a read instruction including said address of said physical storage area obtained by the conversion performed by said control device to a storage device so that said storage device will read out data, and wherein said storage device including a storage area indicated by said address of said physical storage area, said data being stored in said storage area.

2. A control server according to claim 1, wherein said interface unit includes a first interface unit coupled to said one storage device or plural storage devices and a second interface unit coupled to said server device, wherein said second interface unit receiving said address of said virtual volume, and said first interface unit transmitting said address of said physical storage area.

3. A control server according to claim 2, wherein said request requests transmission of said physical address corresponding to said virtual volume, and wherein said second interface unit, further, transmits an answer including said address of said physical storage area obtained by the conversion in accordance with receiving said request to said server device.

4. A control server according to claim 2, wherein said request is an access request to data stored in said virtual volume, and wherein said first interface unit, further instructions storage device including said storage area to read out data, receives said data corresponding to said instruction from said storage device, said data being stored in said storage area indicated by said address of said physical storage area corresponding to said virtual volume included in said access request, said storage device including said storage area, and wherein said second interface unit transmitting said data to said server device which transmits said request, said data having been received by said first interface unit.

5. A control server according to claim 1, wherein said request requests transmission of said physical address corresponding to said virtual address, and wherein said interface unit, further transmits said read instruction to said storage device in accordance with receiving said request and transmits said address of said physical storage area to said server device.

6. A control server according to claim 1, wherein said memory device, further, has stored information on an access history to said storage areas included in said one storage device or plural storage devices, and, based on said information on said access history, wherein said control device predicts a storage area of virtual volume that will be accessed, and calculates address of said physical storage area corresponding to said predicted virtual volume, and wherein said interface unit transmits said read instruction including an address of said predicted storage area to a storage device so that said storage device will read out data, said storage device including said calculated storage area, said data being stored in said predicted storage area.

7. A computer system, comprising:

a server device;

at least one storage device; and a management server coupled to said server device and said one storage device or plural storage devices, wherein said management server includes:

a first interface unit for being coupled to said server device and said one storage device or plural storage devices, a memory device for storing correspondence relationships between physical storage areas and virtual volumes, said physical storage areas being included in said one storage device or plural storage devices, said virtual volumes being virtual storage areas, and a first control device for controlling said first interface unit and said memory device;

wherein said at least one storage device each includes:

a second interface unit for being coupled to said management server, a disk device for configuring said physical storage areas, a cache memory, and a second control device for controlling said second interface unit, said disk device, and said cache memory, wherein said server device transmits a request including address of said virtual volume to said management server, wherein said first interface unit receives said request including an address of said virtual volume from said server device, and, based on said correspondence relationships stored in said memory device, wherein said first control device converts said received address of said virtual volume included in the request into a logical address that is an address of a physical storage area corresponding to said virtual volume, wherein said first interface unit transmitting read instruction of data including said logical address to a storage device including a physical storage area indicated by said logical address, wherein said second interface unit receiving said read instruction including said logical address, and wherein said second control device controlling said disk device so that said disk device will read out data onto said cache memory, said data being stored in said physical storage area on said disk device indicated by said logical address.

8. A computer system according to claim 7, wherein said first interface unit includes a third interface unit for being coupled to said server device and a fourth interface unit for being coupled to said one storage device or plural storage devices, wherein said third interface unit receiving said address of said virtual volume from said server device, and wherein said fourth interface unit transmitting said logical address to said storage device.

9. A computer system according to claim 8, wherein said request requests transmission of logical address information corresponding to a logical volume, wherein said third interface unit, further transmits said logical address obtained by conversion of said first control device to said server device, in accordance with said request, and wherein said server device species a storage device corresponding to said logical address received from said management server in accordance with said request, transmits read out request of data including said logical address to said storage device, and reads out said data from said cache memory of said storage device including said storage area indicated by said logical address, said data being stored in said cache memory, in accordance with said read out instruction from said server device.

10. A computer system according to claim 8, wherein said request is requests reading out data including said virtual volume address, wherein said fourth interface unit, further, receives said data from said cache memory of said storage device including said storage area indicated by said logical address, said data being stored in said cache memory, in accordance with data transmission of said storage device, and wherein said third interface unit transmitting said data to said server device, said server device transmits said request to said management server device, and said data having been received by said fourth interface unit.

11. A computer system according to claim 7, wherein said request is requests to transmit information of logical address corresponding to said virtual volume, wherein said first interface unit, further, transmits said logical address obtained by conversion of said first control device in accordance with said request to said server device, after transmission of said read out instruction, wherein said server device specifies a storage device corresponding to said logical address received from said management server in accordance with said request, transmits read out request of data including said logical address to said storage device, and reads out said data from said cache memory of said storage device including said storage area indicated by said logical address, said data being stored in said cache memory.

12. A computer system according to claim 7, wherein said memory device of said management server, further, has stored information on an access history to said disk device included in each of said one storage device or plural storage devices, and, based on said information on said access history, wherein said first control device predicts a physical storage area that will be accessed, wherein said first interface unit transmitting a logical address to a storage device including said physical storage area predicted, said logical address indicating said physical storage area predicted, wherein said second interface unit receiving said logical address, and wherein said second control device controlling said disk device so that said disk device will read out data onto said cache memory from said physical storage area indicated by said logical address, said data being stored in said physical storage area.

13. A method for a management server to instruct at least one storage device to perform a read-out of data, said management server managing physical storage areas as virtual storage areas, said physical storage areas being included in said at least one storage device, said method comprising the steps of:

receiving a virtual address from a server device, said virtual address being an address of a virtual storage area;

converting said virtual address into a logical address for indicating a physical storage area corresponding to said virtual storage area indicated by said virtual address; and transmitting said logical address to a storage device so that said storage device will read out data, said storage device including said physical storage area, said data being stored in said physical storage area.

14. A method according to claim 13, further comprising a step of:

transmitting said logical address to said server device, wherein said request requests transmission of said logical address corresponding to said virtual address, and wherein said server device transmits read out instruction of data using said logical address to said storage device, and receives data from said storage device.

15. A method according to claim 13, further comprising the steps of:

predicting, based on said virtual address, a physical storage area on said at least one storage device that said server device will access; and transmitting a logical address to a storage device including said physical storage area predicted, said logical address indicating said physical storage area predicted.

* * * * *